No. 619,363. Patented Feb. 14, 1899.
H. STEVENSON.
SOUP SPOON.
(Application filed Aug. 18, 1898.)
(No Model.)
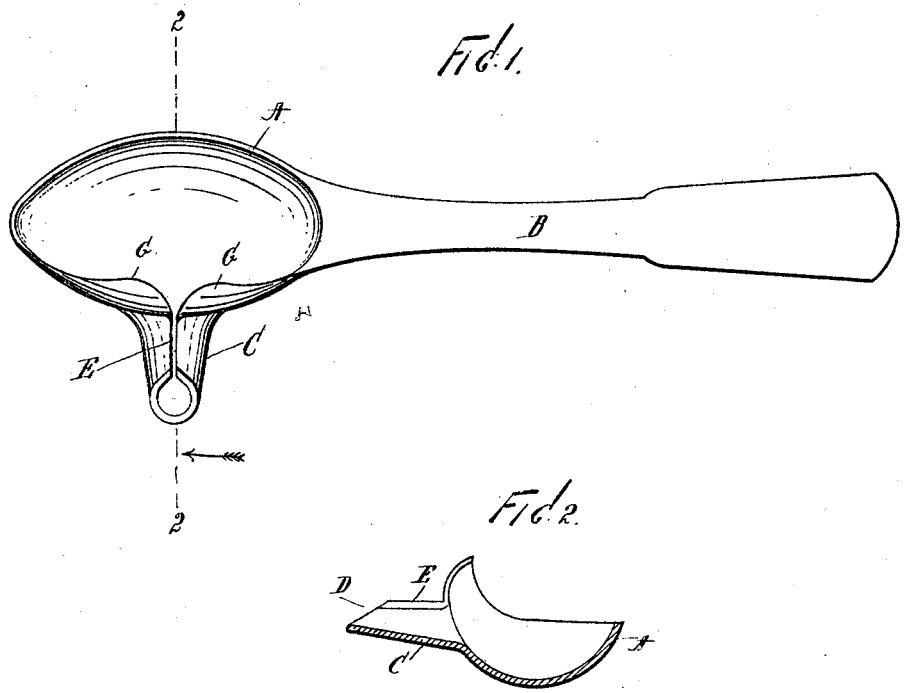

UNITED STATES PATENT OFFICE.

HUGH STEVENSON, OF NEW YORK, N. Y.

SOUP-SPOON.

SPECIFICATION forming part of Letters Patent No. 619,363, dated February 14, 1899.

Application filed August 18, 1898. Serial No. 688,861. (No model.)

*To all whom it may concern:*

Be it known that I, HUGH STEVENSON, a citizen of the United States, residing at New York, in the county of New York and State of New York, have invented certain new and useful Improvements in Soup-Spoons, of which the following is a full and complete specification, such as will enable those skilled in the art to which it appertains to make and use the same.

This invention relates to spoons, and particularly to what are known as "soup-spoons;" and the object thereof is to provide a spoon of this class with a tubular discharge-spout at one side, a further object being to provide what is known as a "mustache-spoon," for the purpose specified.

The invention is fully disclosed in the following specification, of which the accompanying drawings form a part, in which the separate parts of my improvement are designated by the same letters of reference in each of the views, and in which—

Figure 1 is a plan view of my improved spoon; and Fig. 2, a cross-section thereof on the line 2 2, Fig. 1.

In the practice of my invention I provide a spoon A, of the usual form, having a handle B and provided at one side thereof with a discharge-spout C. The discharge-spout C is tubular in form in cross-section, and the outer end thereof is preferably beveled, as shown at D, and formed in the upper side thereof is a longitudinal slot or opening E. The object of the slot or opening E is to facilitate the cleaning of the discharge-spout C, and said slot or opening may be of any desired dimensions. The side of the spoon adjacent to said spout is also provided with inwardly-directed flanges G, which serve to direct the material into the spout and prevent the overflow thereof when the spoon is tipped in the operation of discharging the material through said spout.

My improved spoon is simple in construction and operation and is perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A spoon of the class herein described, said spoon being provided at one side thereof with a tubular discharge-spout, and said spout being provided in the upper side thereof with a longitudinal slot or opening, substantially as shown and described.

2. A spoon of the class herein described, said spoon being provided at one side thereof with a tubular discharge-spout, and said spout being provided in the upper side thereof with a longitudinal slot or opening, and the end of said spout being also beveled, substantially as shown and described.

3. A spoon of the class herein described, said spoon being provided at one side thereof with a tubular discharge-spout, and said spout being provided in the upper side thereof with a longitudinal slot or opening, and the end of said spout being also beveled, and the side of the spoon adjacent to said spout and adjacent to the inner end of said slot being provided with inwardly-directed flanges, substantially as shown and described.

4. A spoon of the class herein described, said spoon being provided at one side thereof with a tubular discharge-spout, said spout being provided in the upper side thereof with a longitudinal slot or opening, and the side of the spoon adjacent to said spout being provided with an inwardly-directed flange, substantially as shown and described.

In testimony that I claim the foregoing as my invention I have signed my name, in presence of the subscribing witnesses, this 10th day of August, 1898.

HUGH STEVENSON.

Witnesses:
 F. A. STEWART,
 V. M. VOSLER.